(12) United States Patent
Billman

(10) Patent No.: US 8,072,926 B1
(45) Date of Patent: Dec. 6, 2011

(54) SYSTEMS AND METHODS FOR DEVICE EMULATION ON MOBILE CHANNEL

(75) Inventor: Bradly Jay Billman, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 341 days.

(21) Appl. No.: 12/487,908

(22) Filed: Jun. 19, 2009

(51) Int. Cl.
*H04Q 7/00* (2006.01)
(52) U.S. Cl. .................. 370/328; 455/418; 345/600
(58) Field of Classification Search .................. None
See application file for complete search history.

(56) References Cited

U.S. PATENT DOCUMENTS

| | | | |
|---|---|---|---|
| 6,046,762 A | 4/2000 | Sonesh et al. | |
| 2005/0097197 A1 | 5/2005 | Vincent | |
| 2006/0023063 A1 | 2/2006 | Okawa et al. | |
| 2006/0277096 A1 | 12/2006 | Levitus | |

OTHER PUBLICATIONS

"Remotely access your computer or PC from your mobile phone using SoonR", Computer Tips From A Computer Guy, Dec. 15, 2007, 5 pages.
"Apple Remote Desktop 3", Remote Assistance, www.apple.com, 2 pages.

*Primary Examiner* — Phuoc Doan
(74) *Attorney, Agent, or Firm* — Brooks, Cameron & Huebsch, PLLC

(57) ABSTRACT

A user may access a website via a mobile channel using a mobile device. As the user is logged into the website, the user may call or otherwise contact a representative via another communications channel with the mobile device or another user device, such as a phone or a user computing device or another mobile device. An emulator engine may determine the type of mobile device that the user is using to access the website via the mobile channel. An emulator for the mobile device that has been determined may be retrieved from an emulator library and provided to the representative computing device. The representative may view the same user interface on the representative computing device that the user sees on the mobile device.

21 Claims, 6 Drawing Sheets

SYSTEMS AND METHODS FOR DEVICE EMULATION ON MOBILE CHANNEL

BACKGROUND

A communications channel refers to the medium used to convey information from a sender to a receiver. Mobile communications channels (referred to herein as a "mobile channels") are well known and may be used by mobile devices. Mobile devices include cellular phone devices, mobile phones, smartphones, handheld computing devices, personal digital assistants, and the like.

Mobile devices may be used by users to access content on a website of a business entity via a mobile channel. Different mobile devices, e.g., depending on the mobile device type and/or manufacturer, have different user interfaces. Thus, the user is presented with a particular arrangement of content from the website, options, menus, selections, etc., depending on the mobile device they are using. The arrangements of content, options, menus, selections, etc. that are presented to the user may vary among the different mobile devices.

Because the user interfaces of the mobile devices differ, it is difficult for a representative of the business entity to assist (e.g., remotely, via phone, etc.) a user who is accessing content on the website on the mobile channel. The representative is not able to specifically see what the user is seeing at the mobile device level for the particular mobile device of the user.

SUMMARY

A user may access a website via a mobile channel using a mobile device. As the user is logged into the website, the user may call or otherwise contact a representative via another communications channel. An emulator engine may determine the type of mobile device that the user is using to access the website via the mobile channel. An emulator for the mobile device that has been determined may be retrieved from an emulator library and provided to the representative computing device. The representative may view the same user interface on the representative computing device that the user sees on the mobile device.

In an implementation, the user may call or otherwise contact a representative with the mobile device that is being used to access the website. In an implementation, the user may call or otherwise contact a representative with another user device besides the mobile device that is being used to access the website, such as a phone or a user computing device or another mobile device.

In an implementation, the user may request a callback from the representative via the website, and the representative may call the user back on the mobile device or another user device.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there are shown in the drawings example constructions of the embodiments; however, the embodiments are not limited to the specific methods and instrumentalities disclosed. In the drawings.

DETAILED DESCRIPTION

Figure 1:
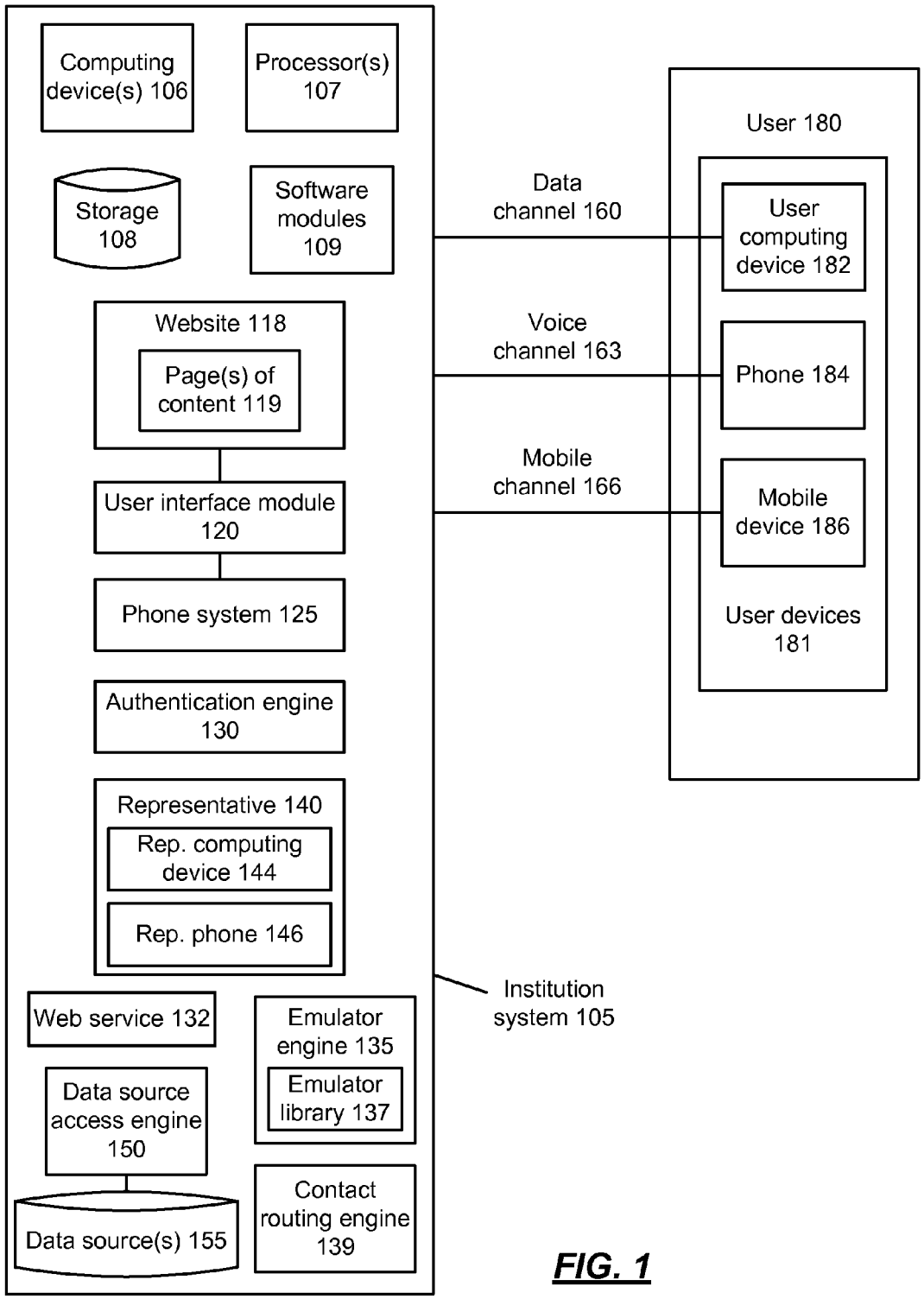
FIG. 1 is a block diagram of an implementation of a system that may be used to provide device emulation on a mobile channel.

FIG. 1 is a block diagram of an implementation of a system that may be used to provide device emulation on a mobile channel. An institution system 105 may include an authentication engine 130. The authentication engine 130 may authenticate a user 180 who is attempting to access the institution system with one or more user devices 181 by a communications channel, such as a data channel 160 associated with a user computing device 182, a voice channel 163 associated with a phone 184, or a mobile channel 166 associated with a mobile device 186. It is contemplated that more than one of the communications channels may be used by a single user device, such as the user computing device 182, the phone 184, or the mobile device 186 to access the institution system 105, as described further herein.

The user 180 may be seeking access to the institution system 105 to obtain information about an institution associated with the institution system 105, an account of the user 180 maintained by the institution system, products or services, or to speak with a representative 140, for example. The institution may be any type of entity or business. For example, the institution may be a financial services institution, a credit card association or member of a credit card association, a retail bank, an investment bank, an investment company, etc. The institution system 105 may include any combination of systems and subsystems such as electronic devices including, but not limited to, computers, servers, databases, or the like. The electronic devices may include any combination of hardware components such as processors, databases, storage drives, registers, cache, random access memory (RAM) chips, data buses, or the like and/or software components such as operating systems, database management applications, or the like.

The user devices 181 and communications channels described herein are examples only, and any number and any types of user devices 181 and communications channels may be implemented. The phone 184 may be any type of telecommunications device used to transmit and receive sound, such as a corded telephone, a cordless phone, a mobile phone, etc. The mobile device 186 may be any type of mobile computing device, such as a mobile phone, a smartphone, a handheld computing device, or a personal digital assistant (PDA). An example user computing device 182 is described with respect to FIG. 6. Additionally, any number of users with associated user devices may be in communication with the institution system 105.

Each of the user computing device 182, the phone 184, and the mobile device 186 may be connected with the institution system 105 over one or more communications channels of an associated network. It is contemplated that each network may be any type of private or public communication network such as, for example, an intranet, Internet, local area network (LAN), wide area network (WAN), wireless fidelity (WiFi) network, cellular connection, plain old telephone service (POTS), a public switched telephone network (PSTN), a voice over Internet protocol (VoIP) network, and the like. The user computing device 182, the phone 184, and the mobile device 186 may be connected to the institution system 105 over the same network or different networks.

The institution system 105 may comprise a representative 140 who may have an associated representative computing device 144 and representative phone 146. The representative 140 may communicate with the user 180 over a communications channel using the representative computing device 144 or the representative phone 146. An example representative computing device 144 is described with respect to FIG. 6, and the representative phone 146 may be any type of telecommunications device used to transmit and receive sound. Although only one representative is shown in FIG. 1, it is contemplated that any number of representatives and associated representative computing devices and representative phones may be in communication with or otherwise associated with the institution system 105 and may be used for communication with the user 180.

As described further herein, the user 180 may access a website 118 of the institution system 105 via the mobile channel 166 using the mobile device 186. The website 118 provided via the mobile channel 166 may be different than the website provided via the data channel 160 to the user computing device 182, for example, with respect to displays, content, and/or tools provided to the user 180.

At some point, as the user 180 is logged into the website 118 via the mobile channel 166, the user 180 may call or otherwise contact the representative 140 via another communications channel with the mobile device 186 or another of the user devices 181, such as the phone 184 or the user computing device 182 or another mobile device. Thus, in an implementation, at some point, the user 180 may initiate another connection to the institution system 105 via a second communications channel with a second user device that is different than the mobile device 186 via the first communications channel (e.g., the mobile channel 166). For example, the user 180 may wish to speak with the representative 140 of the institution system 105 about a user account, a product or service, etc. In an implementation, the user 180 may initiate this connection by calling the representative 140 or the institution system 105 or by requesting a call from the representative 140, e.g., via a request made on the website 118. In this case, the communications channel may be a voice channel such as the voice channel 163.

An emulator engine 135 may determine the type of mobile device 186 (e.g., Apple iPhone, Research in Motion BlackBerry, Samsung, Nokia, etc.) that the user 180 is using to access the website 118 via the mobile channel 166. Any known technique may be used to determine the type of mobile device 186 that is being used to access the website 118.

An emulator library 137 comprises a plurality of emulators of various types of mobile devices. An emulator for the mobile device 186 that has been determined may be retrieved from the emulator library 137, if such an emulator is available, and provided to the representative computing device 144. In this manner, the representative 140, when speaking or otherwise communicating with the user 180 (e.g., by the voice channel, by instant message, by text message, by web chat, using the representative phone 146, etc.) about the website 118 as rendered on the mobile device 186 via the mobile channel 166, may view the same user interface on the representative computing device 144 that the user 180 sees on the mobile device 186. This allows for more accurate and detailed service from the representative 140 to the user 180 regarding the website 118 and information associated with, or provided by, the website 118.

An emulator duplicates (i.e., provides an emulation of) the functions of one system using a different system, so that the second system behaves like and appears to be the first system. Emulation refers to the ability of a computer program or electronic device to imitate another program or device. Thus, emulation allows the representative computing device 144 to provide the representative 140 with the look, feel, and behavior of the mobile device 186 (e.g., the user interface of the mobile device 186) that has been determined to be in use by the user 180.

For example, if the mobile device 186 of the user 180 is determined to be an iPhone, an iPhone emulator may be provided to the representative computing device 144 that mimics the user interface of the website 118 provided to the mobile device 186. The user 180 activity may be tracked by the institution system 105, e.g., by the emulator engine 135, and such activity may be provided to the representative 140 and/or the representative computing device 144 on displays that are the same as those being provided to the mobile device 186 so that the representative 140 can see the actions that the user 180 is taking. Although providing the emulator on the representative computing device 144 with data regarding the user 180 and their activity is not co-browsing, the representative 140 and the user 180 may have the same experience with respect to the website 118 as provided on the mobile device 186, and allows the representative 140 to avoid "what are you seeing?" type questions to the user 140 during the communication (e.g., via voice, instant message, text message, web chat, etc.) between the representative 140 and the user 180.

The authentication engine 130 and the emulator engine 135 may analyze, process, and store the data from the user 180 and the user devices 181 and the representative 140 in one or more data sources 155 via a data source access engine 150. The data may also be stored in other storage, perhaps in storage associated with the institution system 105 such as storage 108. The authentication engine 130 may use the data to authenticate the user 180 (e.g., via strong authentication, via weak authentication, etc.) to permit the user 180 access to content associated with the institution system 105 via a communications channel through which the user 180 is seeking access. Data that may be stored may include personal data about the user 180, such as user names, passwords, pass phrases, personal identification numbers (PINs), and other data that may be used to identify and authenticate the user 180.

The institution system 105 may include a user interface module 120. The user interface module 120 may generate and format one or more pages of content 119 as a unified graphical presentation that may be provided to one or more of the user devices 181, such as the mobile device 186, as an output from the institution system 105. The page(s) of content 119 may be provided to the mobile device 186 via the website 118 associated with the institution system 105. The page(s) of content 119 may be provided to other user devices 181 of the user 180, such as the phone 184 or the user computing device 182, depending on the implementation.

In an implementation, instead of hosting the website 118, the institution system 105 may comprise a conventional application server hosting a proprietary online service accessible only a private network. In any event, the institution system 105 may have appropriate security mechanisms in place to prevent unauthorized third parties from intercepting the user's information.

The institution system 105 may also comprise a web service 132. The web service 132 may capture the user session data (e.g., contextual information, such as user identifier, webpage clicked from, additional session information, etc.). In an implementation, the web service 132 may make a call to storage, such as the data source(s) 155 or the storage 108 for a data lookup to retrieve the user's previously stored phone numbers or contact information (e.g., gathered from a user's earlier purchase, membership or registration information, or public sources such as online telephone listings or books).

The user interface module 120 may provide the user 180 with access to a phone system 125 of the institution system 105. The phone system 125 may be any type of system that may provide information to a device of the user 180, such as the phone 184 or the mobile device 186. In an implementation, the phone system 125 may use any type of phone menu system and may use interactive voice response (IVR) which is a phone technology that allows a computer to detect voice and touch tones using a phone call. An IVR system can respond with prerecorded or dynamically generated audio to further direct users on how to proceed. IVR systems can be used to control almost any function where the interface can be broken down into a series of menu choices. For example, the user 180 may dial a phone number that is answered by an IVR system. The IVR system may execute an application which is tied to the number dialed. As part of the application, prerecorded audio files or dynamically generated text to speech audio may explain the options available to the user 180. The user 180 may be given the choice to select options using DTMF (dual-tone multi-frequency) tones or spoken words. Examples of typical IVR applications include telephone banking and credit card transactions.

In an implementation, the phone system 125 may comprise a voice portal which gives access to information maintained by the institution system 105 through spoken commands and voice responses. The voice portal could be an access point for any type of information, services, or transactions found on the Internet. A voice portal may be automated and/or Internet-based to provide interactive voice services. Information may also be provided to the user 180 via the representative 140.

The institution system 105 may comprise a contact routing engine 139. The contact routing engine 139 may be used to determine whether the representative 140 is available to call back the user 180 at the phone 184 of the user 180 and may also be used to determine which representative is available, as described further herein.

In an implementation, the user 180 may use the user interface module 120 to interact with the authentication engine 130, for example, to authenticate to the institution system 105 via one or more communications channels. The user 180 may use the user interface module 120 to request or receive information from the institution system 105, e.g., in conjunction with the data source access engine 150 which may retrieve data from data source(s) 155, storage 108, and other storage internal and/or external to the institution system 105, in an implementation.

Data may also be provided to the authentication engine 130 by the user 180 or the representative 140. The data may be received via the user interface module 120 in an implementation. The retrieved and/or received data may be associated with the user 180 and may be used to authenticate the user 180 and provide access to information maintained by the institution system 105 via one or more communications channels.

The institution system 105 may comprise one or more computing devices 106. The user 180 may interact with the computing device(s) 106 via the user computing device 182, the phone 184, or the mobile device 186 via the appropriate communications channel. The computing device(s) 106 may have one or more processors 107, storage 108 (e.g., storage devices, memory, etc.), and software modules 109. The computing device(s) 106, including its processor(s) 107, storage 108, and software modules 109, may be used in the performance of the techniques and operations described herein. Information associated with the user 180, the mobile device 186 of the user 180, and authentication of the user 180 may be stored in storage 108 or other storage such as data source(s) 155, for example.

Examples of software modules 109 may include modules for identifying and authenticating the user 180, generating web page content for display via the data channel 160 and/or the mobile channel 166, generating phone system content, determining the type of mobile device 186 the user is accessing the website 118 with, retrieving an emulator for the mobile device 186 from the emulator library 137 and loading the emulator on the representative computing device 144, and receiving requests and instructions from the user 180, described further herein. While specific functionality is described herein as occurring with respect to specific modules, the functionality may likewise be performed by more, fewer, or other modules. An example computing device and its components are described in more detail with respect to FIG. 6.

It is contemplated that the techniques described herein may be used with respect to two separate user devices each having at least one communications channel, or a single user device having multiple communications channels.

Figure 2:
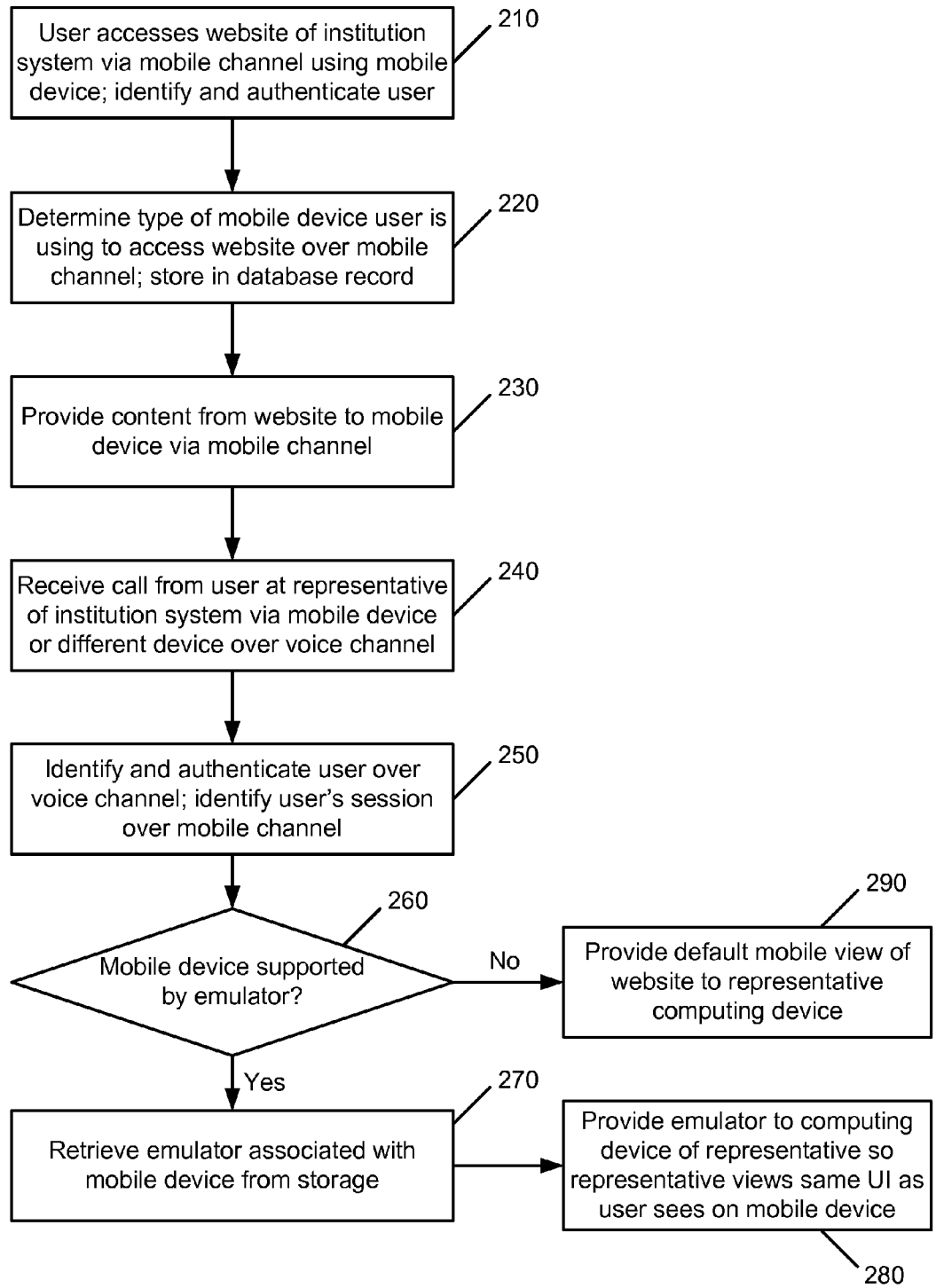
FIG. 2 is an operational flow of an implementation of a method that may be used to provide device emulation on a mobile channel.

FIG. 2 is an operational flow of an implementation of a method 200 that may be used to provide device emulation on a mobile channel. At 210, a user, such as the user 180, may access a website of an institution system, such as the website 118 of the institution system 105, via a mobile channel, such as the mobile channel 166, using a mobile device, such as the mobile device 188 (e.g., using a browser on the mobile device), and may be identified and authenticated via the mobile channel using known authentication techniques, such as two-factor authentication or other types of strong authentication using known strong authentication techniques (e.g., involving user name, password, pass phrase, PIN, or any other authentication factors). The user may wish to browse the website for account information, information on products and services, etc.

At 220, using known techniques, the institution system may determine the type of mobile device (e.g., an iPhone, a Blackberry, a Samsung smartphone, etc.) that the user is using to access the website over the mobile channel and store this information in a database record associated with the user, for example. Identification information pertaining to the user and the session may also be stored in the database record. Content may be provided from the institution system (e.g., the website of the institution system) to the mobile device via the mobile channel at 230.

During the interaction with the website, the user may reach a point where they have a question or would like assistance or further information immediately, e.g., before making a purchase of goods or services. At some point, the user may initiate another connection to the institution system via another communications channel with the same device, such as a data channel or voice channel on the mobile device, or a different device such as a phone or personal computer (PC), for example. Thus, a user may access an institution system via more than one communications channel, either by the same device (e.g., a mobile device accessing the institution system via a mobile channel, a voice channel, and/or a data channel) or by different devices (e.g., a PC via a data channel or a phone via a voice channel). Communication may thus be established between the institution system (e.g., a representative) and the user.

At 240, the user may call the institution system, using the mobile device or any phone, to speak with a representative, e.g., about content or information from the institution system that is displayed on the mobile device, about an interaction of the user with the website as displayed on the mobile device, about the user interface that is displayed on the mobile device, etc. The user may use the same device, such the mobile device of the user, to concurrently access an institution system through multiple communications channels (mobile channel, voice channel, data channel, etc.) on the same device. In an implementation, the user may contact and interact with the representative of the institution by other electronic techniques, such as instant message, text message, or web chat, for example.

It may be determined if the user is still in an active session on the first communications channel (e.g., if the user is already authenticated to the system on the first communications channel such as the mobile channel). In an implementation, the authentication engine may query the various communications channels to confirm that an authenticated session with the user is already in progress.

At 250, the user may be identified and authenticated over the voice channel (or data channel if the user is contacting the institution system via a data channel) using known authentication techniques. The identification of the user over the voice channel (or the data channel) may be used to identify the session of the user over the mobile channel, e.g., by accessing the database record associated with the user that had previously been stored at 220. The identification of the user over the voice channel may be used as a pointer into the appropriate database record associated with the user and data from the database may be retrieved pertaining to the user and the session over the mobile channel. Thus, the institution system may identify the user's session over the mobile channel pursuant to receiving an identification of the user over the voice channel.

At 260, it may be determined if the mobile device is supported by an emulator. Such a determination may be performed by determining if the institution system has an emulator that corresponds to the mobile device type from 220. If so, at 270, an emulator associated with the determined mobile device may be retrieved from storage of the institution system (e.g., the emulator library 137 comprising a plurality of emulators, each of the plurality of emulators associated with a different type of mobile device), and at 280, the emulator may be provided to the computing device of the representative. The representative's view of the website may be changed to that of the mobile device's rendering of the website through the emulator. In this manner, the representative may view the same user interface that the user is provided on the mobile device.

If it is determined at 260 that the mobile device is not supported by an emulator, a default emulator may be used to provide a default mobile view of the website to the representative via the representative computing device at 290. The default mobile view of the website may be a view for a general mobile device and not tailored to a specific mobile device.

Figure 3:
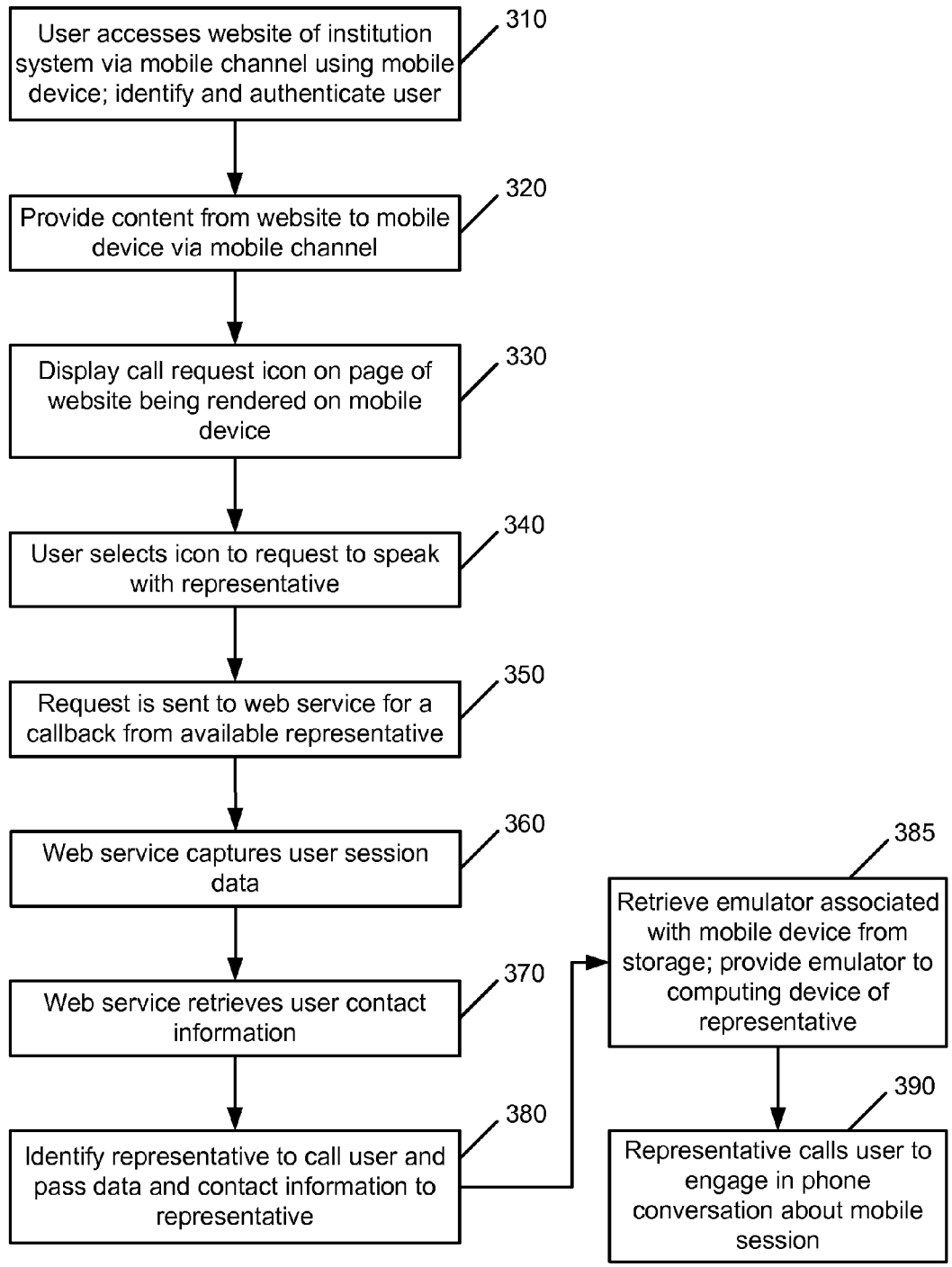
FIG. 3 is an operational flow of another implementation of a method that may be used to provide device emulation on a mobile channel.

FIG. 3 is an operational flow of another implementation of a method 300 that may be used to provide device emulation on a mobile channel. At 310, similar to 210, a user may access a website of an institution system via a mobile channel using a mobile device, and may be identified and authenticated using known authentication techniques. Content may be provided from the institution system to the mobile device via the mobile channel at 320.

At 330, a call request icon directed to obtaining help for the user may be displayed on the page of the website that is being rendered on the mobile device. An icon, a link, or other selectable item such as a button or menu item (collectively referred to herein as an icon) may be displayed on the page along with other content to request an immediate callback (e.g., within about 10 seconds) from a representative at the institutions system associated with the website or page. The icon may be displayed with a message, for example, that states "click to speak with a representative" or the like.

At some point, if the icon is being displayed, the user may select or click on the icon at 340 to request to speak with a representative. After the user clicks the icon, for example, previously stored phone numbers associated with the user may be displayed in a window, and the user may select one of the numbers to be called back on. Alternately, the user may enter a number in a window on which to receive the callback. The user may also input comments or questions in the window, for example, which may be provided to the representative ahead of the callback.

When the request for a callback is submitted, a representative may be selected (e.g., via the contact routing engine 139 of FIG. 1) to call the user back with help, in some embodiments immediately, using the number the user selected or entered. In this manner, the user may remain on the website via the mobile channel and receive the assistance via a voice channel.

This request may be sent to a web service at 350 for a callback to the user from an available representative. At 360, the web service may capture the user session data (e.g., contextual information, such as type of mobile device used to access the website, a user identifier and/or other user information, webpage clicked from, additional session information, etc.) At 370, the web service may make a call to storage, such as a central user information database associated with the institution system, for a data lookup to retrieve the user's previously stored phone numbers or contact information (e.g., gathered from a user's earlier purchase, membership or registration information, or public sources such as online telephone listings or books).

At 380, a representative may be identified that is to call the user and the data from 360 and 370 may be passed to the representative. At 385, an emulator may be retrieved from storage using the device type (e.g., determined at 360) that is used by the user on the mobile channel and this emulator is provided on the representative computing device. The representative's view of the website is changed to that of the mobile device's rendering of the website through the emulator. In this manner, the representative may view the same user interface that the user is provided on the mobile device. At 390, the representative may call the user (either manually or with an auto-dialer, for example) and the representative and the user may engage in a phone conversation, e.g., about the user's mobile channel session with the website that is being provided to the mobile device of the user.

Figure 4:
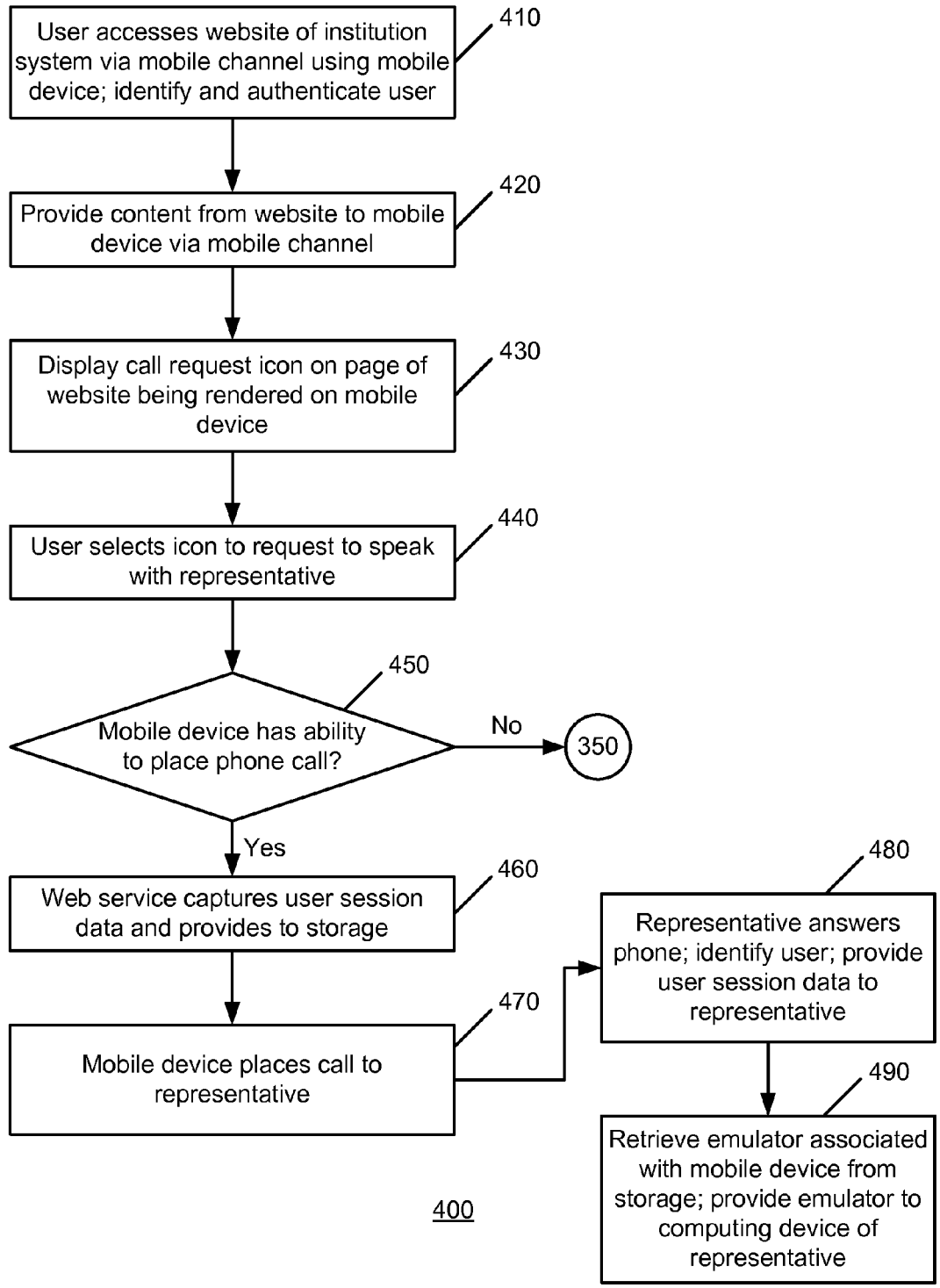
FIG. 4 is an operational flow of another implementation of a method that may be used to provide device emulation on a mobile channel.

FIG. 4 is an operational flow of another implementation of a method 400 that may be used to provide device emulation on a mobile channel. At 410, a user may access a website of an institution system via a mobile channel using a mobile device, and may be identified and authenticated using known authentication techniques. Content may be provided from the institution system to the mobile device via the mobile channel at 420. At 430, a call request icon directed to obtaining help for the user may be displayed on the page of the website that is being rendered on the mobile device. The user may select or click on the icon at 440 to request to speak with a representative. Operations 410 through 440 are similar to operations 310 through 340 described with respect to the method 300 and their further descriptions may be omitted for brevity.

At 450, it may be determined if the mobile device has the capability to place a phone call (e.g., via a voice channel). If not, then processing may proceed at 350 as set forth above with respect to the method 300.

If the mobile device is able to place a phone call, then at 460, a web service may capture the user session data (e.g., contextual information, such as type of mobile device used to access the website, a user identifier and/or other user information, webpage clicked from, additional session information, etc.) and provide this information to storage of the institution system. At 470, the mobile device is instructed to place a call to a representative, e.g., via an application on the mobile device and using a phone number or contact information of the representative provided upon selection of the call request icon.

At 480, the representative may answer the phone and pursuant to the user being identified, the data from 460 may be provided to the representative (e.g., from storage). At 490, an emulator may be retrieved from storage using the device type that is used by the user on the mobile channel and this emulator may be provided on the representative computing device, thereby changing the representative's view of the website to that of the mobile device's rendering of the website. The representative and user may engage in a phone conversation, e.g., about the user's mobile channel session with the website that is being accessed by the mobile device of the user.

Figure 5:
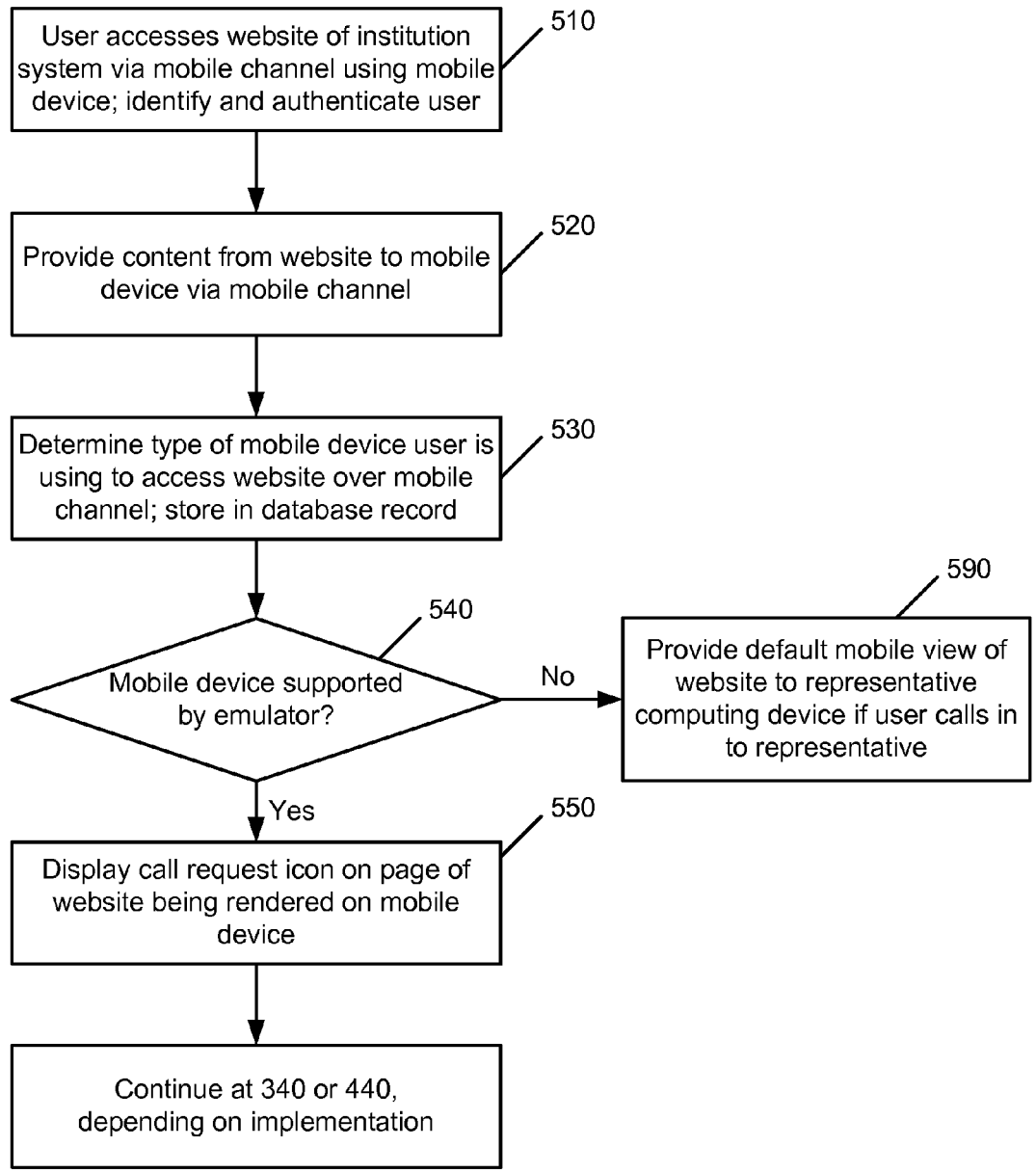
FIG. 5 is an operational flow of another implementation of a method that may be used to provide device emulation on a mobile channel.

FIG. 5 is an operational flow of another implementation of a method 500 that may be used to provide device emulation on a mobile channel. At 510, similar to 210, a user may access a website of an institution system via a mobile channel using a mobile device, and may be identified and authenticated using known authentication techniques. Content may be provided from the institution system to the mobile device via the mobile channel at 520.

At 530, using known techniques and similar to 220 for example, the institution system may determine the type of mobile device that the user is using to access the website over the mobile channel. Similar to 260, it may be determined at 540 if the mobile device is supported by an emulator in storage of the institution system.

If so, at 550, similar to 330, a call request icon directed to obtaining help for the user may be displayed on the page of the website that is being rendered on the mobile device and processing may continue at 340 or 440, for example, depending on the implementation. Thus, it may be determined whether an icon should be displayed, e.g., in a corner of the page display, that is directed to a callback request. In some embodiments, the icon may be displayed only under certain circumstances or rules (e.g., if the mobile device is supported by an emulator).

If the mobile device is not supported by an emulator as determined at 540, an icon directed to obtaining help for the user may not be displayed on the page of the website that is being rendered on the mobile device. Should the user call in to the institution system to speak with a representative, a default mobile view of the website may be generated and provided to the representative at 590.

Figure 6:
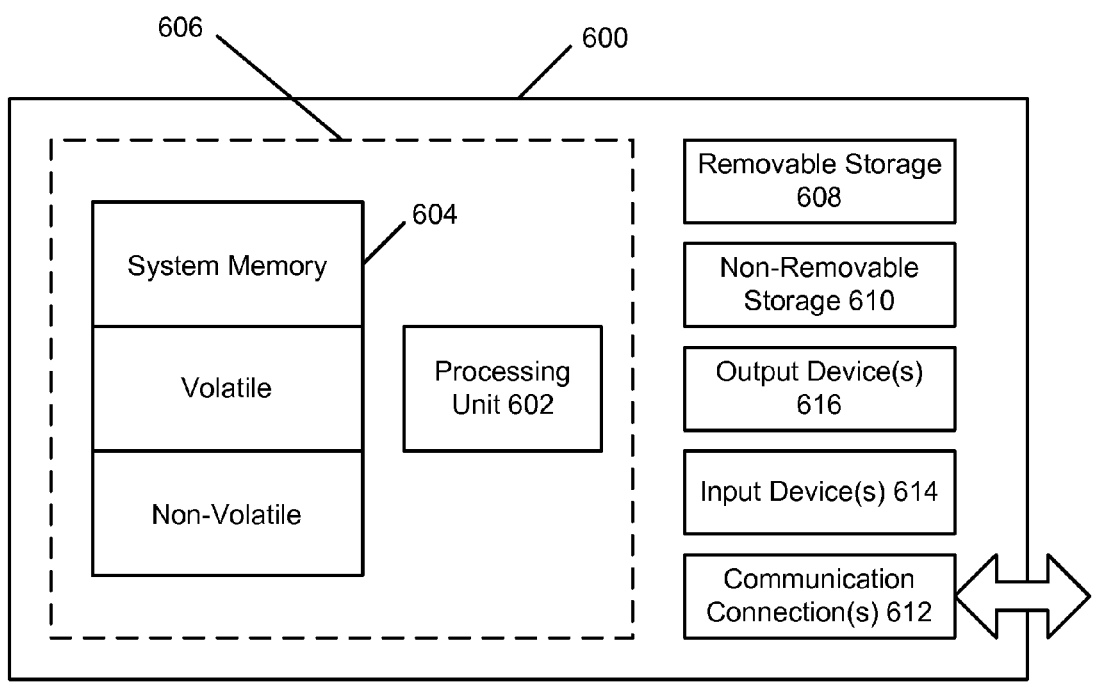
FIG. 6 is a block diagram of an example computing environment in which example embodiments and aspects may be implemented.

FIG. 6 shows an exemplary computing environment in which example embodiments and aspects may be implemented. The computing system environment is only one example of a suitable computing environment and is not intended to suggest any limitation as to the scope of use or functionality.

Numerous other general purpose or special purpose computing system environments or configurations may be used. Examples of well known computing systems, environments, and/or configurations that may be suitable for use include, but are not limited to, PCs, server computers, handheld or laptop devices, multiprocessor systems, microprocessor-based systems, network PCs, minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 6, an exemplary system for implementing aspects described herein includes a computing device, such as computing device 600. In its most basic configuration, computing device 600 typically includes at least one processing unit 602 and system memory 604. Depending on the exact configuration and type of computing device, system memory 604 may be volatile (such as RAM), non-volatile (such as read-only memory (ROM), flash memory, etc.), or some combination of the two. This most basic configuration is illustrated in FIG. 6 by dashed line 606.

Computing device 600 may have additional features and/or functionality. For example, computing device 600 may include additional storage (removable and/or non-removable) including, but not limited to, magnetic or optical disks or tape. Such additional storage is illustrated in FIG. 6 by removable storage 608 and non-removable storage 610.

Computing device 600 typically includes a variety of computer-readable media. Computer-readable media can be any available media that can be accessed by computing device 600 and include both volatile and non-volatile media, and removable and non-removable media. By way of example, and not limitation, computer-readable media may comprise computer storage media and communication media.

Computer storage media include volatile and non-volatile, and removable and non-removable media implemented in any method or technology for storage of information such as computer-readable instructions, data structures, program modules or other data. System memory 604, removable storage 608, and non-removable storage 610 are all examples of computer storage media. Computer storage media include, but are not limited to, RAM, ROM, Electrically Erasable Programmable Read-Only Memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 600. Any such computer storage media may be part of computing device 600.

Computing device 600 may also contain communication connection(s) 612 that allow the computing device 600 to communicate with other devices. Communication connection(s) 612 is an example of communication media. Communication media typically embody computer-readable instructions, data structures, program modules, or other data in a modulated data signal such as a carrier wave or other transport mechanism, and include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, radio frequency (RF), infrared, and other wireless media. The term computer-readable media as used herein includes both storage media and communication media.

Computing device 600 may also have input device(s) 614 such as a keyboard, mouse, pen, voice input device, touch input device, etc. Output device(s) 616 such as a display, speakers, printer, etc. may also be included. All these devices are well known in the art and need not be discussed at length here.

Computing device 600 may be one of a plurality of computing devices inter-connected by a network. As may be appreciated, the network may be any appropriate network, each computing device 600 may be connected thereto by way of communication connection(s) 612 in any appropriate manner, and each computing device 600 may communicate with one or more of the other computing devices 600 in the network in any appropriate manner. For example, the network may be a wired or wireless network within an organization or home or the like, and may include a direct or indirect coupling to an external network such as the Internet or the like.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application programming interface (API), reusable controls, or the like. Such programs may be implemented in a high level procedural or object-oriented programming language to communicate with a computer system. However, the program (s) can be implemented in assembly or machine language, if desired. In any case, the language may be a compiled or interpreted language and it may be combined with hardware implementations.

Although exemplary embodiments may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include PCs, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A device emulation system, comprising:
    at least one subsystem that provides content from an institution system to a mobile device of a user over a mobile channel;
    at least one subsystem that determines a type of the mobile device;
    at least one subsystem that loads an emulator on a computing device of a representative of the institution system using the type of the mobile device; and
    at least one subsystem that establishes a communication between the representative and the user over a communications channel other than the mobile channel while still providing the content from the institution system to the mobile device over the mobile channel.

2. The system of claim 1, wherein the communications channel is a voice channel and the at least one subsystem that establishes the communication comprises at least one subsystem that establishes a phone call between the representative and the user.

3. The system of claim 1, wherein the content is provided from a website of the institution system.

4. The system of claim 1, further comprising at least one subsystem that retrieves the emulator from storage of the institution system, the storage comprising a plurality of emulators, each of the plurality of emulators associated with a different type of mobile device.

5. The system of claim 1, wherein the communication between the representative and the user is established using the mobile device of the user.

6. The system of claim 1, wherein the communication between the representative and the user is established using a device other than the mobile device of the user.

7. The system of claim 1, further comprising at least one subsystem that authenticates the user over the mobile channel and stores the type of the mobile device in a database record associated with the user in a storage of the institution system.

8. A computer-readable medium comprising computer-readable instructions for device emulation, said computer-readable instructions comprising instructions that:
    display a call request icon on a webpage of a website being accessed by a user during a session via a mobile device over a mobile channel;
    receive a user selection of the call request icon;
    determine a representative to call the user;
    retrieve one emulator from a plurality of emulators from storage using a type of the mobile device, each of the plurality of emulators associated with a different type of mobile device;
    load the one emulator on a computing device of the representative; and place a phone call between the representative and the user over a voice channel while the mobile device is still in the session with the website over the mobile channel.

9. The computer-readable medium of claim 8, further comprising instructions that determine the type of the mobile device prior to displaying the call request icon on the webpage, and display the call request icon on the webpage if the type of the mobile device is supported by one of the plurality of emulators.

10. The computer-readable medium of claim 8, further comprising instructions that capture data regarding the session with the website over the mobile channel and provide the data to the computing device of the representative.

11. The computer-readable medium of claim 8, wherein the instructions that place the phone call comprise instructions that call the user at a previously stored phone number associated with the user.

12. The computer-readable medium of claim 8, further comprising instructions that receive a user selection of one of a displayed plurality of previously stored phone numbers associated with the user, and wherein the instructions that place the phone call comprise instructions that call the user at a selected phone number.

13. The computer-readable medium of claim 8, wherein the phone call is placed to the mobile device of the user, and communication is established between the representative and the user over a voice channel of the mobile device while the mobile device is still in the session with the website over the mobile channel.

14. The computer-readable medium of claim 8, wherein the phone call is placed to a different device than the mobile device of the user and communication is established between the representative and the user over a voice channel of the different device while the mobile device is still in the session with the website over the mobile channel.

15. A computer-readable medium comprising computer-readable instructions for device emulation, said computer-readable instructions comprising instructions that:
   display a call request icon on a display of a mobile device of a user over a mobile channel, the display further comprising content provided over the mobile channel from an institution system;
   receive a user selection of the call request icon;
   determine whether the mobile device has an ability to place a phone call over a communications channel other than the mobile channel being used to provide the content to the mobile device; and
   if the mobile device has the ability, then place the phone call from the mobile device to the institution system over the communications channel, otherwise establish a communication between the institution system and the user using a device other than the mobile device while still providing the content from the institution system to the mobile device over the mobile channel.

16. The computer-readable medium of claim 15, further comprising instructions that determine a type of the mobile device being used to access the content of the institution system over the mobile channel and use the type of the mobile device to determine whether the mobile device has the ability to place the phone call over the communications channel other than the mobile channel being used to provide the content to the mobile device.

17. The computer-readable medium of claim 16, further comprising instructions that:
   retrieve an emulator associated with the type of the mobile device from a storage of the institution system, the storage comprising a plurality of emulators, each of the plurality of emulators associated with a different type of mobile device; and
   provide the emulator to a computing device of a representative of the institution system, the representative being in communication with the user.

18. The computer-readable medium of claim 17, further comprising instructions that capture data regarding the user and the content provided over the mobile channel and provide the data to the computing device of the representative.

19. The computer-readable medium of claim 16, further comprising instructions that:
   determine if the type of mobile device is supported by an emulator in a storage of the institution system, the storage comprising a plurality of emulators, each of the plurality of emulators associated with a different type of mobile device; and
   if so, provide the emulator to a computing device of a representative of the institution system, the representative being in communication with the user, otherwise provide a default emulator to the computing device of the representative.

20. The computer-readable medium of claim 15, further comprising instructions that determine a type of the mobile device being used to access the content of the institution system over the mobile channel, and only display the call request icon if the type of the mobile device is supported by an emulator in a storage of the institution system, the storage comprising a plurality of emulators, each of the plurality of emulators associated with a different type of mobile device.

21. The computer-readable medium of claim 15, wherein the communication between the institution system and the user using a device other than the mobile device comprises one of a text message, an instant message, a web chat, and a phone call.

* * * * *